US010743483B1

(12) United States Patent
Melrose (10) Patent No.: US 10,743,483 B1
(45) Date of Patent: Aug. 18, 2020

(54) WIRELESS REMOTE UPDATES TO SCHEDULES IN IRRIGATION CONTROLLERS (71) Applicant: Hoover Pumping Systems Corporation, Pompano Beach, FL (US)

(72) Inventor: David Ross Melrose, Pompano Beach, FL (US)

(73) Assignee: Hoover Pumping Systems Corporation, Pompano Beach, FL (US)

( * ) Notice: Subject to any disclaimer, the term of this patent is extended or adjusted under 35 U.S.C. 154(b) by 40 days.

(21) Appl. No.: 16/361,412

(22) Filed: Mar. 22, 2019

(51) Int. Cl.
*A01G 25/16* (2006.01)
*G05B 19/042* (2006.01)

(52) U.S. Cl.
CPC ......... *A01G 25/165* (2013.01); *A01G 25/167* (2013.01); *G05B 19/042* (2013.01); *G05B 2219/2625* (2013.01)

(58) Field of Classification Search
CPC .... A01G 25/16; A01G 25/165; A01G 25/167; G05B 2219/2625; G05B 19/042
See application file for complete search history.

(56) References Cited

U.S. PATENT DOCUMENTS

| | | | |
|---|---|---|---|
| 5,173,855 A | 12/1992 | Nielsen et al. | |
| 5,251,153 A | 10/1993 | Nielsen et al. | |
| 5,479,338 A | 12/1995 | Ericksen et al. | |
| 5,740,031 A | 4/1998 | Gagnon | |
| 6,298,285 B1 | 10/2001 | Addink et al. | |
| 6,782,311 B2 | 8/2004 | Barlow et al. | |
| 7,305,280 B2 | 12/2007 | Marian | |
| 7,805,221 B2 * | 9/2010 | Nickerson | A01G 25/16 239/69 |
| 7,844,368 B2 | 11/2010 | Alexanian | |
| 7,966,153 B2 | 6/2011 | Bangalore | |
| 8,793,024 B1 | 7/2014 | Woytowitz et al. | |
| 9,043,964 B2 | 6/2015 | Nickerson et al. | |
| 9,104,993 B2 | 8/2015 | Miller et al. | |
| 9,161,499 B2 | 10/2015 | Bailey et al. | |
| 9,258,951 B2 | 2/2016 | Sacks | |
| 9,414,552 B2 | 8/2016 | Halahan et al. | |
| 9,468,162 B2 | 10/2016 | Weiler et al. | |
| 9,829,871 B1 | 11/2017 | Goodman et al. | |

(Continued)

FOREIGN PATENT DOCUMENTS

| | | |
|---|---|---|
| WO | 2015002795 | 8/2015 |
| WO | 2018101848 | 6/2018 |

*Primary Examiner* — Abdelmoniem I Elamin
(74) *Attorney, Agent, or Firm* — Jon Gibbons; Fleit Intellectual Property Law (57) ABSTRACT

A system and method for managing a schedule on an irrigation controller is claimed. For each irrigation zone, out of a set of one or more irrigation zones, the process begins by receiving input for an irrigation controller for both i) an offset from an irrigation cycle start time according to a master clock in the irrigation controller and ii) a length of run time. Next the offset from the irrigation cycle start timer and the length of runtime is stored in an ordered array. An overall multiplier for an array is also stored. Continuing further the ordered array with or without the overall multiplier is wirelessly transmitted to the irrigation controller. In one example the set of the one or more irrigation zones are in numerical order. In another example the set of one more irrigation zones is out of numerical order.

17 Claims, 8 Drawing Sheets

(56) References Cited

U.S. PATENT DOCUMENTS

| | | | |
|---|---|---|---|
| 9,888,081 B1 | 2/2018 | Farinelli, Jr. et al. | |
| 10,123,493 B2 | 11/2018 | Runge et al. | |
| 10,231,391 B2* | 3/2019 | Standerfer | A01G 25/16 |
| 10,609,878 B2* | 4/2020 | Montgomery | A01G 25/167 |
| 2013/0211604 A1* | 8/2013 | Brundisini | A01G 25/16 |
| | | | 700/284 |
| 2014/0129039 A1* | 5/2014 | Olive-Chahinian | A01G 25/16 |
| | | | 700/284 |
| 2016/0050860 A1* | 2/2016 | Standerfer | A01G 25/16 |
| | | | 700/284 |
| 2016/0113219 A1 | 4/2016 | Tennyson et al. | |
| 2017/0020089 A1* | 1/2017 | Endrizzi | A01G 25/165 |
| 2017/0223904 A1 | 8/2017 | Raccanello | |
| 2018/0014480 A1* | 1/2018 | Montgomery | A01G 25/16 |
| 2019/0200546 A1* | 7/2019 | Larsen | A01G 25/16 |
| 2019/0261584 A1* | 8/2019 | Olive-Chahinian | A01G 25/16 |
| 2019/0261585 A1* | 8/2019 | Weiler | A01G 25/165 |
| 2019/0297798 A1* | 10/2019 | Levine | G05B 13/026 |

* cited by examiner

WIRELESS REMOTE UPDATES TO SCHEDULES IN IRRIGATION CONTROLLERS

PARTIAL WAIVER OF COPYRIGHT

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

FIELD OF THE INVENTION

This present invention generally relates to irrigation control, and more specifically to methods and systems for providing remote control to irrigation systems over wireless networks.

BACKGROUND OF THE INVENTION

Existing methods of organizing and presenting scheduling data for irrigation controllers can result in high wireless data transmission costs, and long transmission times to communicate schedule settings and adjustments to irrigation controllers that are part of a distributed architecture irrigation control systems. This is especially problematic in remote areas in which cellular and other wireless infrastructure may be lacking. The existing methods can also lack flexibility in irrigation controller operations with regard to operation of simultaneous zones, operation of zones out of numerical sequence, and efficiently scaling irrigation cycle durations while maintaining the time and flow rate proportions between zone operations.

One method for wireless controllers is to always send down a new schedule over a wireless network to the controllers in the field. This method results in high transmission costs and long transmission times.

Another method is to increase the number of programs. The number of programs is increased to the number of simultaneously run zones or a greater number. This works, but results in a system that is not well suited to use in a distributed architecture where schedule changes must often be communicated over wireless connections with performance limitations and significant data costs. It also does not provide an efficient method for running zones out of numerical order, or for communicating and applying adjustment factors to account for changing irrigation requirements.

Still, another known solution is to provide for individual zone control by sending a complete separate schedule for each zone. This approach provides for flexibility in operations, at the cost of increased volume and complexity of scheduling data, and of increased complexity of user interface.

Accordingly, a need exists to overcome the problems with individual pump station control while reducing data transmission over wireless networks.

SUMMARY OF THE INVENTION

The present invention provides a novel system and method for managing a schedule on an irrigation controller. For each irrigation zone, out of a set of one or more irrigation zones, the process begins with receiving input for an irrigation controller for both i) an offset from an irrigation cycle start time according to a master clock in the irrigation controller and ii) length of run time. Next, the offset from the irrigation cycle start timer and length of run time are stored in an ordered array. An overall multiplier for an array is also stored. Continuing further the ordered array with or without the overall multiplier is wirelessly transmitted to the irrigation controller. In one example the set of the one or more irrigation zones are in numerical order. In another example the set of one more irrigation zones is out of numerical order.

In the irrigation plan in which there are a plurality of irrigation zones, it is important to note that more than one zone may be operated simultaneously in order to achieve hydraulic efficiency of a site and/or an electrical efficiency of the site and/or maintain water flow velocity within an operational band to counter biofouling and buildup of other contaminants and to limit damage from excessive velocities. Moreover, the irrigation zones may be operated by two or more pumps that operate simultaneously to help meet these efficiency and operational goals.

In one example, the method continues in which a change to an overall irrigation run cycle for the irrigation controller is received. The change to the overall irrigation run cycle for the irrigation controller is based on one or more of weather, evapotranspiration rate, soil moisture, rainfall, or a combination thereof. The overall multiplier for the array based on the change in the overall irrigation run cycle is updated. The overall multiplier for the array is wirelessly transmitted to the irrigation controller. A pump station is communicatively coupled to a set of multiple irrigation controllers. Steps above are repeated for each irrigation controller in the set of multiple irrigation controllers.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention will be apparent from the following detailed description, taken in conjunction with the accompanying drawings in which:

DESCRIPTION OF THE PREFERRED EMBODIMENTS

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The invention provides an efficient method of organizing and transmitting scheduling data to an irrigation controller that is part of a distributed architecture irrigation control system so that data transmission costs and transmission times are reduced. The invention permits greater flexibility in the irrigation controller operations, and also allows for efficient irrigation controller schedule execution. In particular, the addition of the zone start offset data facilitates operation of simultaneous zones, up to the maximum physically possible on the individual irrigation controller. Further, zones can be readily selected to run in arbitrary order, out of numerical sequence. This flexibility in operations permits the system to optimize its operation to accommodate hydraulic and landscape factors. Another advantage over prior solutions is that presentation of schedule data to an end user is simplified when multiple zones are scheduled to run simultaneously. Reliability of the system is improved over previous solutions because the reduction in quantity of transmitted data reduces opportunities for communication errors. The invention allows ongoing adjustments of the zone start times and run times of the irrigation schedule in response to factors such as weather, evapotranspiration rate, and rainfall, without requiring the re-transmission of all of the schedule data.

With regard to the specific issue of operating zones out of their numerical order, mapping solutions have been known, where each zone number is mapped to a possibly different operational order number.

Non-Limiting Definitions

The terms "a", "an" and "the" preceding an element or component are intended to include the plural forms as well, unless the context clearly indicates otherwise.

In "fluid communications" means that there is a path between two elements or parts in which water and other fluids can flow. The path may not be a direct path between the two elements. For example the path may have one or more valves, pumps or other branches between the two elements.

"Irrigation Controller" is sometime referred to as a "clock".

"Site" means a source of irrigation water, such as a pump station or point of connection, piping, suction line, discharge headers, main lines, sub-mains, lateral lines, valves, and may contain one or more irrigation controllers.

"Zone" means one irrigation area controlled by a single output. Note that more than one valve could be connected to a single output of the irrigation controller, and the method would still work. The term station is sometimes interchangeable in the industry.

Example Client-Server Irrigation Controller

Figure 1:
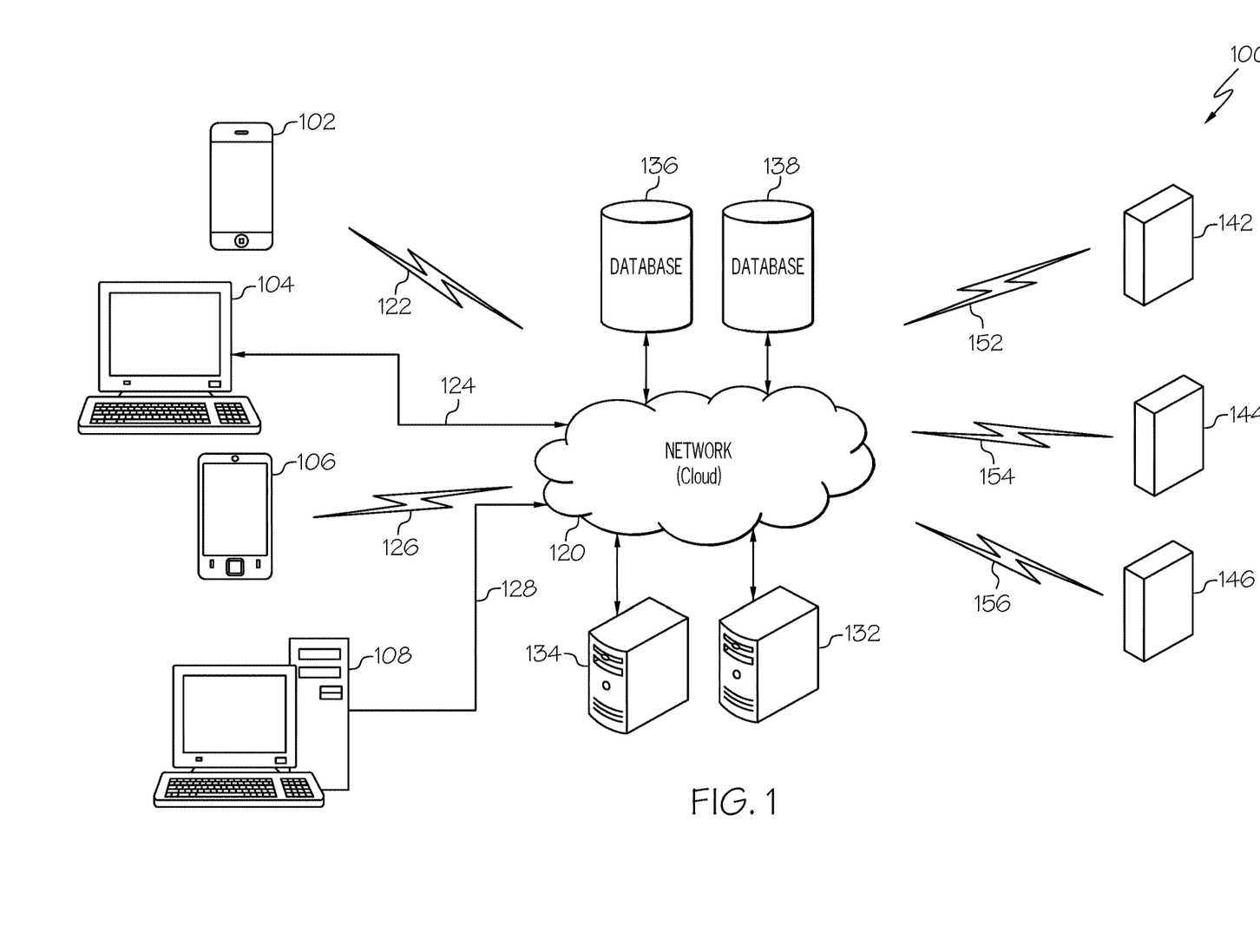
FIG. 1 is a diagram of a computer system useful for implementing irrigation control software of the present invention.

Referring to FIG. 1 shown is a system architecture with clients 102, 104, 106, at least one web server 132 and non-volatile storage in databases, 136, 138. A client is a computer or a process or thread running on a computer that requests resources or services from another computer. Exemplary clients of FIG. 1 include: a smart phone 102 coupled to the network 120 through a wireless connection 122, a laptop computer 104 coupled to the network 120 through a wired connection 124, a tablet smart phone 106 and desktop computer 108 which is coupled to the network 120 through a wired connection 128.

The system of FIG. 1 includes a data communications network 120 which provides for data communications between clients 102, 104, 106, 108 and web server 132. Also shown are irrigation controllers 142, 144, and 146 which also operate as clients or servers in some cases, as they can initiate communication. A network is a group of computers coupled for data communications according to data communications protocols through other computers typically referred to as routers, bridges, or switches. The routers, bridges, and switches are not shown on FIG. 1.

The server 132 is a computer or a process or thread running on a computer that receives, processes, and responds to requests for resources or services from another computer. A web server is a server that carries out data communication according to a hyperlinking protocol. A common example of a hyperlinking protocol is the HyperText Transfer Protocol, the foundation of the World Wide Web. The term 'web server' is used in this specification more broadly, however, to refer to any server that support any hyperlinking protocol, including, for example, the Wireless Access Protocol (WAP), the Handheld Device Transport Protocol (HDTP), and others as will occur to those of skill in the art. The web server 132 provides static web pages in responses to clients as well as dynamic web pages in such formats as Java Server Pages (JSP), PHP Hypertext Processor (PHP) pages, Microsoft's Active Server Pages (ASP), and Common Gateway Interface (CGI) scripts, and others as will occur to those of skill in the art.

Some caution is advised in use of the terms "client" and "server" because whether a particular computer acts as a client or a server depends upon role. In the system of FIG. 1, for example, when web server 132 receives from laptop computer 104 a request for a web page, web server 132 is acting as a server; when, however, web server 132 requests resources from application server 134 in order to fulfill the request from personal computer 108, web server 132 acts as a client.

The system of FIG. 1 also includes application servers 134 communicatively coupled for data communications to web server 132. The application server 132 is also connected to databases 136, 138. The system of FIG. 1 also includes non-volatile storage in the form of databases 136, 138. The application servers 134 have installed and operating on them replication peers (not shown). A peer is a computer or a process or thread running on a computer that has the same capabilities of requesting and responding to requests as other computers similarly situated in a network. Although one or more application servers are required and a web server is useful, a web server is not strictly required.

The arrangement of servers and other devices making up the example system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may be implemented as local area networks (LANs), wide area networks (WANs), intranets, internets, and others as will occur to those of skill in the art. Networks in such data processing systems may support many data communications protocols, including, for example, the Transmission Control Protocol (TCP), the Internet Protocol (IP), the HyperText Transfer Protocol (HTTP), the Wireless Access Protocol (WAP), the Handheld Device Transport Protocol (HDTP), and others as will occur to those of skill in the art. Various embodiments of the present invention may be implemented on a variety of hardware platforms in addition to those illustrated in FIG. 1.

Irrigation Plan

Figure 2:
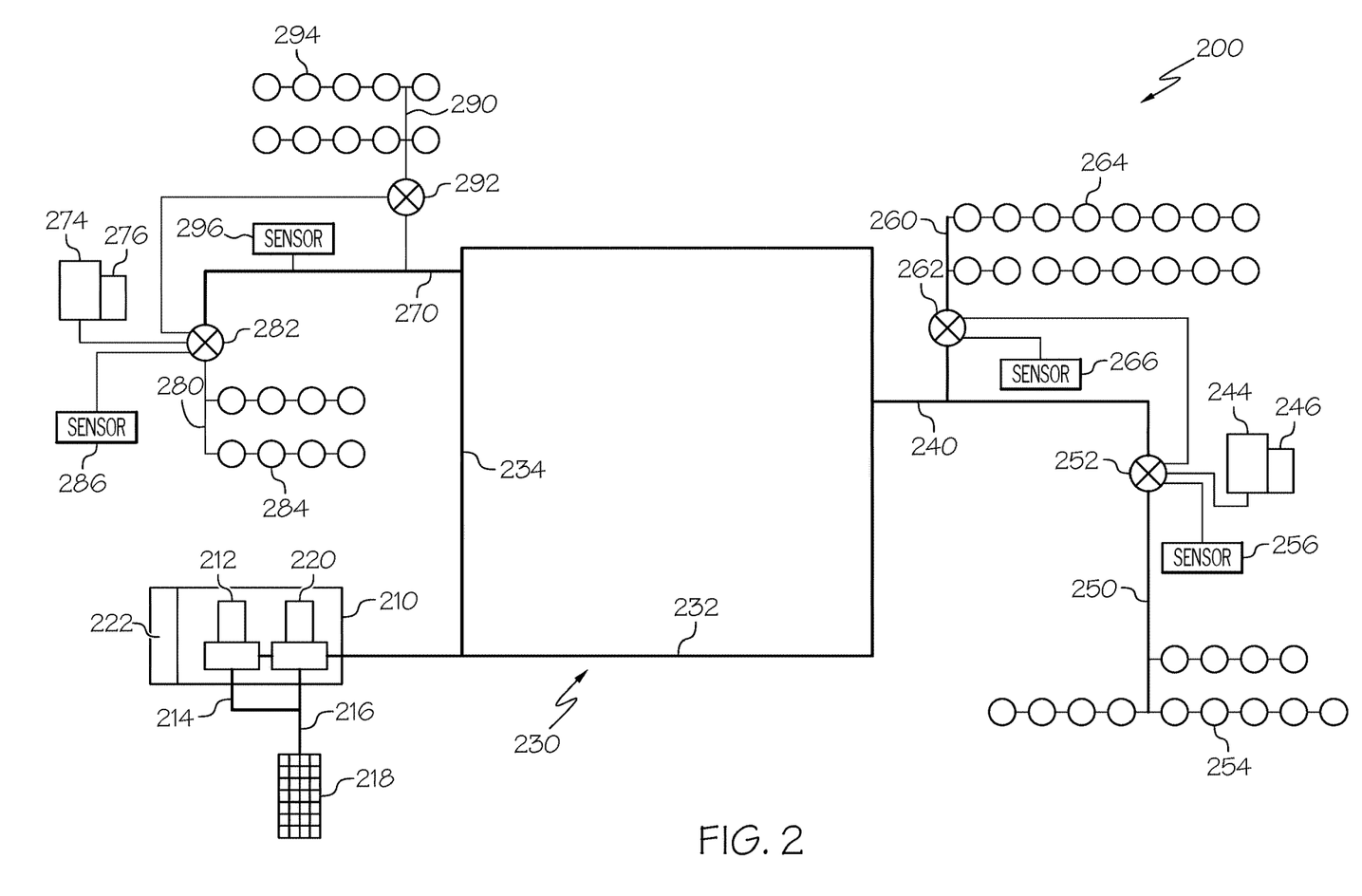
FIG. 2 is a diagram of an irrigation plan being controlled by the irrigation control software of the present invention.

FIG. 2 is a diagram of an irrigation plan 200 being controlled by the irrigation control software of the present invention. Only the major functions of the management system are shown. This irrigation plan receives wireless communication for remote irrigation scheduling. Irrigation schedule data can be organized in a hierarchal structure. For example a "site", which is generally associated with a source of irrigation water, such as a pump station or point of connection, may contain one or more irrigation controllers. The irrigation controllers execute programs to operate devices, such as zone control solenoid valves and pump stations, according to an irrigation schedule. The irrigation schedule data for a particular irrigation controller may consist of multiple programs. Each program defines multiple start times and water days. Zone run durations are defined for each program. The key invention is the addition of a zone start offset value, defined for each zone on each program. These zone start offset values are indexed to zero at the beginning of each program start cycle. Adjustment values are also defined, which are applied as scalar factors to the matrices of zone start offset values and zone run durations, in order to smoothly scale the irrigation cycle duration to be longer or shorter.

Referring again to FIG. 2 illustrates a pump station 210 which typically houses the components necessary to pumping water from a water source to irrigation heads. The pump station houses at least one pump and motor 212 and a control panel 222. The pump and motor 212 is typically an electrical motor powered from the public utility grid but in other examples the motor can be powered locally with a diesel generator set or directly through an internal combustion engine. Pump and motor 212 are typically specified by horsepower, volumetric flow rate and outlet pressure and inlet suction of head. The heads can be simplified as a number of feet or meters the motor and pump can raise or lower a column of water at atmospheric pressure.

The control panel 222 may contain starters, contactors, variable frequency drives, circuit breakers and other branch protection circuitries. In some examples, the pump station 210 may protect the control panel, pumps and other electrical equipment from the weather elements.

The pump and motor 212 includes at least one inlet or suction line 216 and one outlet or discharge head 220. The suction line through an intake screen 218 draws water from a water source such as a lake, canal, well, storage tank, or other water source and discharges it under through discharge header 220 at an outlet pressure and volumetric flow rate.

The discharge header 220 is in fluid communications with the mainline 230. In this example, the mainline 230 is shown as a loop. This is preferable because it allows the water flow to go in more than one direction 232 and 234. Having more than one direction reduces the maximum volumetric flow rate in each direction.

Two submains 240, 270 are in fluid communications with the mainline pipe or just mainline 230. The flow from the mainline 230 is directed into each submain pipe or submain 240, 270. Each submain 240, 270 may have one or more lateral lines or pipes. In this simplified example, each submain 240, 270 in turn has two lateral lines 250, 260, 280, 290 as shown. A zone value 252, 262, 282, and 292, which is electrically activated controls the water flow into each lateral line 250, 260, 280, 290.

In turn each lateral line 250, 260, 280, 290 is in fluid communication with one or more irrigation heads 254, 264, 284, 294. The exact type of irrigation head is not important to the control aspect of the present invention. Any type of irrigation head, pop-up and rotor, impact rotor, gear-driven rotor, drip, large turn rotor is not important to the control aspect of the present invention.

In this example, an irrigation controller 244, 274 is used each submain 240, 270. The irrigation controller 244, 274 (items 142, 144, 146 in FIG. 1) each have cellular router or other means to connect to the internet 120 as shown in FIG. 1. It is important to note the number of irrigation controllers and the number of zone valves shown in FIG. 2 are an example only. In other examples any number irrigation controllers can be used with more than two zone values is common.

A group of local sensors 256, 266, 286, and 296 that measure soil moisture and microclimates (wind, precipitation, temperature, humidity) may also be used. The number of local sensors may be one to each zone as shown or one per pump station depending on the geographic area covered by the irrigation plan. This group of local sensors may electrically communication back to the zone valves 252, 262, 282, 292, the location irrigation controllers 246, 296, the network 120 over wireless including use of APIs back to the sensors or a combination of these.

A typical sequence of operation is:

Initial system configuration data is entered. This data may include zone irrigation precipitation rate, zone plant type, zone soil type, zone distribution uniformity, zone intake rate, soil holding capacity, zone flow rate, mainline pipe size, submain pipe size, pump-station best efficiency point flow rate.

Current environmental data is collected, such as rainfall, weather, soil moisture, and current evapotranspiration rate.

Using the system configuration data and environmental data, as well as the operating history of the irrigation system, the central irrigation system or a user calculates and enters, by site, the irrigation schedule data for each irrigation controller's programs, such as the start times, water days, zone run durations, and zone start offsets—in order to optimize the hydraulic performance of the system, conserve water, comply with water restrictions or other operational limitations, and promote maximum landscape or crop health.

The irrigation schedule data is automatically sent to the individual irrigation controllers.

The irrigation controllers execute a program, which operate the zone valves, pump station, and other connected devices according to the irrigation schedule data.

On an ongoing basis, adjustments to the existing irrigation schedule are required due to weather, evapotranspiration rate, soil moisture, and rainfall, and other factors. Adjustment factors are calculated and communicated to the irrigation controllers.

Any adjustment factor received by the Irrigation Controller is applied as a scalar factor to the zone start offset values and zone run durations matrices to smoothly scale the zone start times and run times as needed, without disrupting the flow rate relation between simultaneously operating zones.

Key elements: User interaction with the system is generally through a mobile, desktop, or browser client in a client-server architecture, or locally at the irrigation controller through a human-machine interface.

The irrigation controllers are typically connected to the central irrigation system via the Internet. A common connection device is a cellular router co-located with the irrigation controller.

Irrigation Schedule data is sent over the internet to the irrigation controllers over transmission protocols such as FTP, Modbus, and HTTPS. The irrigation controllers communicate their status, history, and alarms over the internet to the central control system via such protocols.

Irrigation Control User Interface

Figure 3:
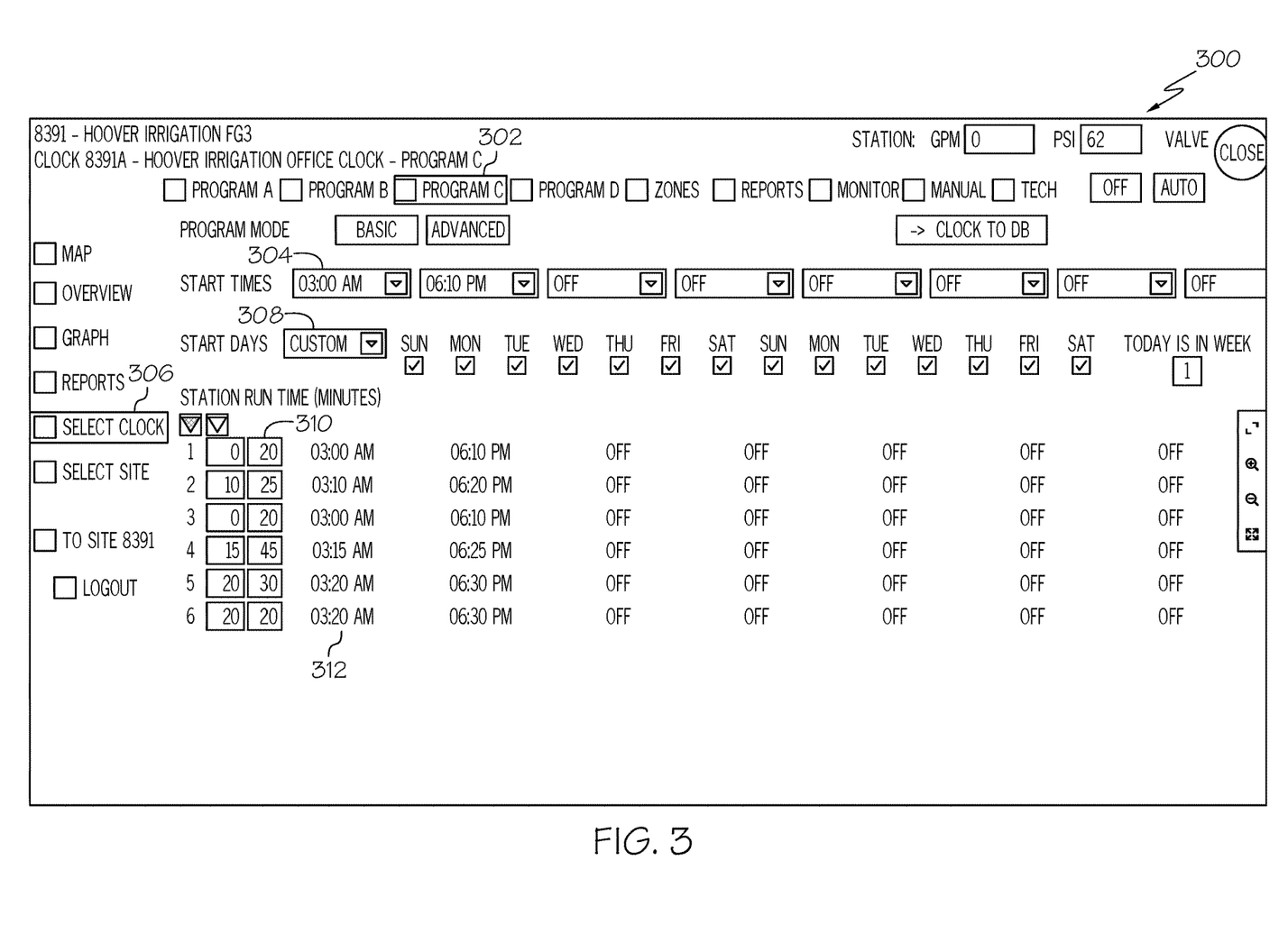
FIG. 3 is a graphical user interface for configuring and setting up the software of the irrigation control software of the present invention.

FIG. 3 is a graphical user interface 300 for configuring and setting up the software of the irrigation control software of the present invention. Shown are a variety of user interface widgets.

Any widget displays an information arrangement changeable by the user, such as a window or a text box. The defining characteristic of a widget is to provide a single interaction point for the direct manipulation of a given kind of data. In other words, widgets are basic visual building blocks which, combined in an application, hold all the data processed by the application and the available interactions on this data.

Various types of special-purpose or "stock" graphical user interface components, or widgets or controls (or, common controls), are also included in most GUI toolkits or libraries or in most operating systems that natively support graphical user interfaces. (For example, Microsoft Windows, Apple Macintosh, various X-Window based window systems on Unix platforms, and other GUI systems on virtual machines such as Java Swing, Microsoft .Net framework, etc., and iOS and Android, and other operating systems for handheld devices or mobile handsets, etc.)

Commonly used GUI controls includes buttons, radio buttons, check box, cycle button, slider, list box, drop down list and menus. Other GUI allows a user to enter text or value inputs such as text box or a drop-down list or list box and a single-line editable textbox. In certain implementations, the list control part may always be displayed along with the edit control part (e.g., instead of being toggled between the hidden and pulled-down states). Other variations are also found.

Referring to graphical user interface 300 shown is selection button 302 to select among a number of programs possible. A simplified menu on the left side shows that "select clock" 306. Also shown is possible start times 304 for the program and start days 308. The start time and start days may be based on a user preference, local government regulations, utility costs, water availability, and other factors.

A series of zone start offsets from the program start times master clock and zone run durations or run times are shown in 310 with the effective start time of each zone for each program start time shown in 312. In another embodiment, the offsets are hidden and the user increments or decrements the clock 312. In this example the effective start time 312 is used to calculate the offsets from the program start times master clock.

Graphical user interface 300 illustrates other information such as status. The other statuses including program being worked on, GPM, PSI and other items.

Figure 4:
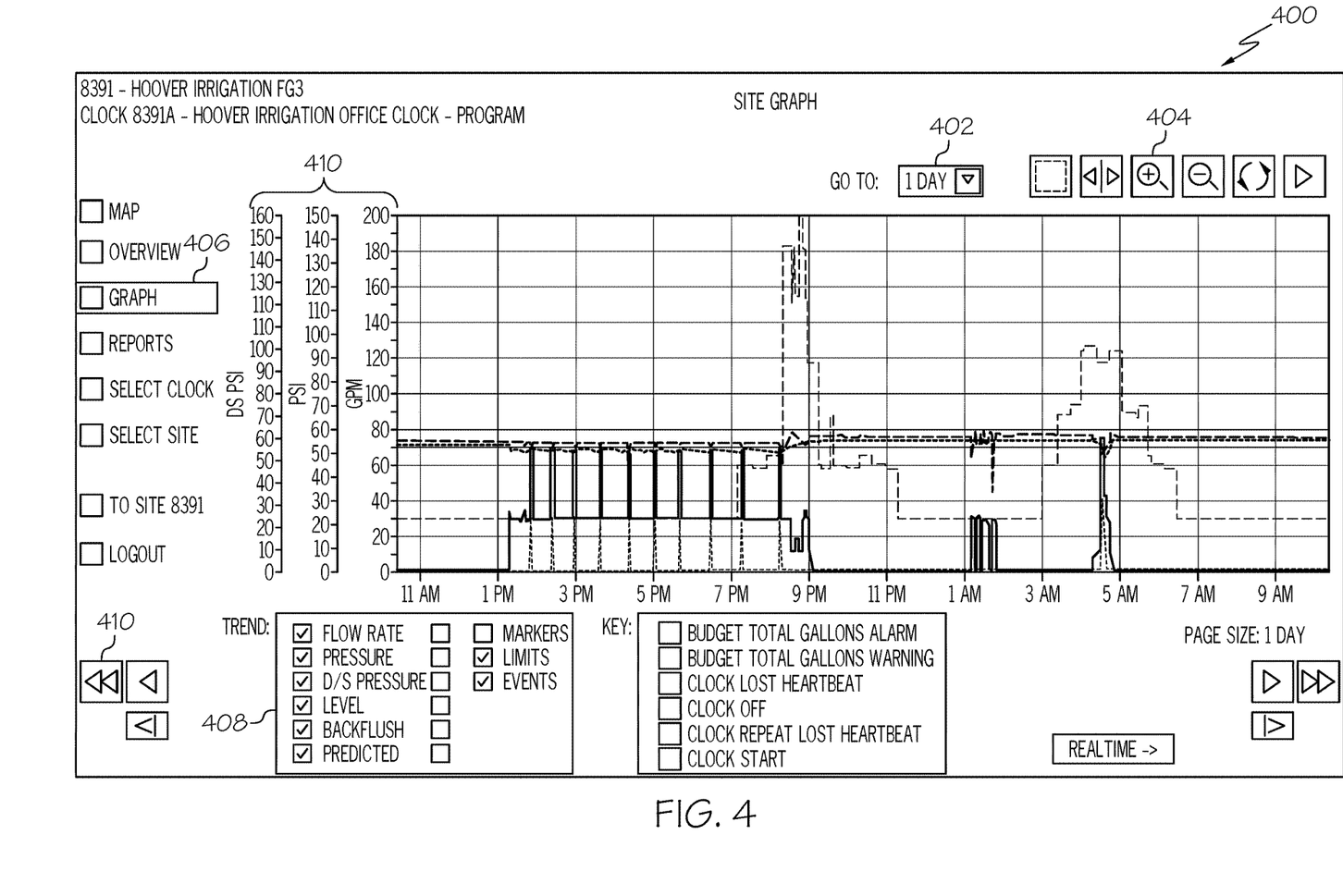
FIG. 4 is a graph of the irrigation system being controlled by the irrigation control software of the present invention.

FIG. 4 is a graph 400 of the irrigation system being controlled by the irrigation control software of the present invention. Like FIG. 3 various interface widgets such as period of time for graph in days 402, zoom in, zoom out, and mail icons 404, menu 406, and display options (Flow Rate, Pressure, D/S Pressure, Level, Backflush, Predicted, Markers, Limits, Events) 408 are shown. Multiple y-axis legends GPM, PSI, D/S PSI—410 are also shown. Colors, shading, animation, pop-up windows, "how to" multimedia tutorials can all be part of this graphical user interface 300 and graph 400.

In the irrigation plan in which there are a plurality of irrigation zones, it is important to note that more than one zone may be operated simultaneously in order to achieve hydraulic efficiency of a site and/or an electrical efficiency of the site and to maintain flow velocities within an operational band: high enough to counter biofouling and buildup of other contaminants, and low enough to limit the energy available that might cause damage from sudden changes in velocity. Moreover, the irrigation zones may be operated by two or more pumps that operate simultaneously to help meet these efficiency goals.

Flow Diagram of Irrigation Control Software

Figure 5:
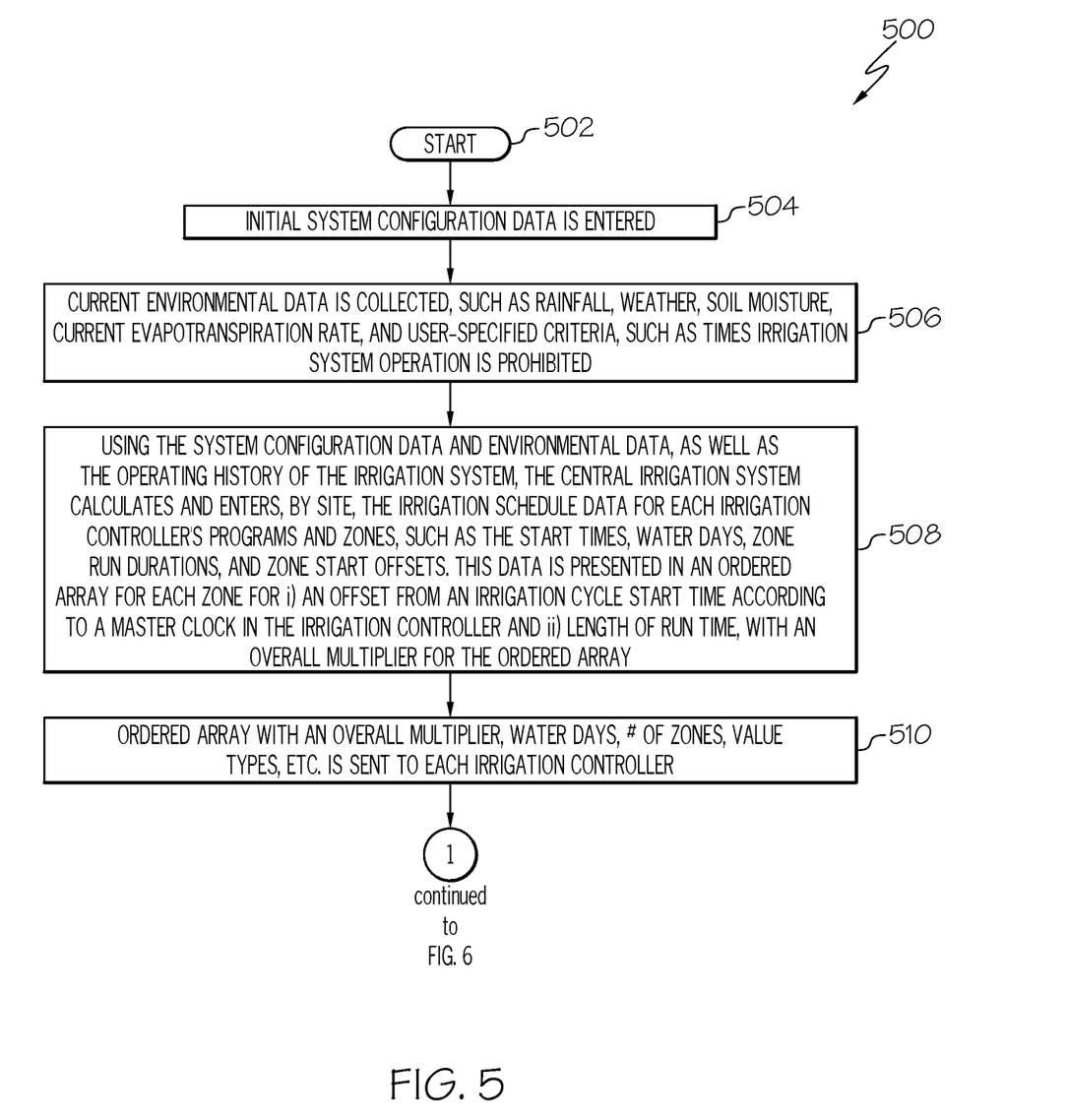
FIG. 5 and FIG. 6 is a flow diagram of the irrigation control software running on the server of FIG. 1.
Figure 6:
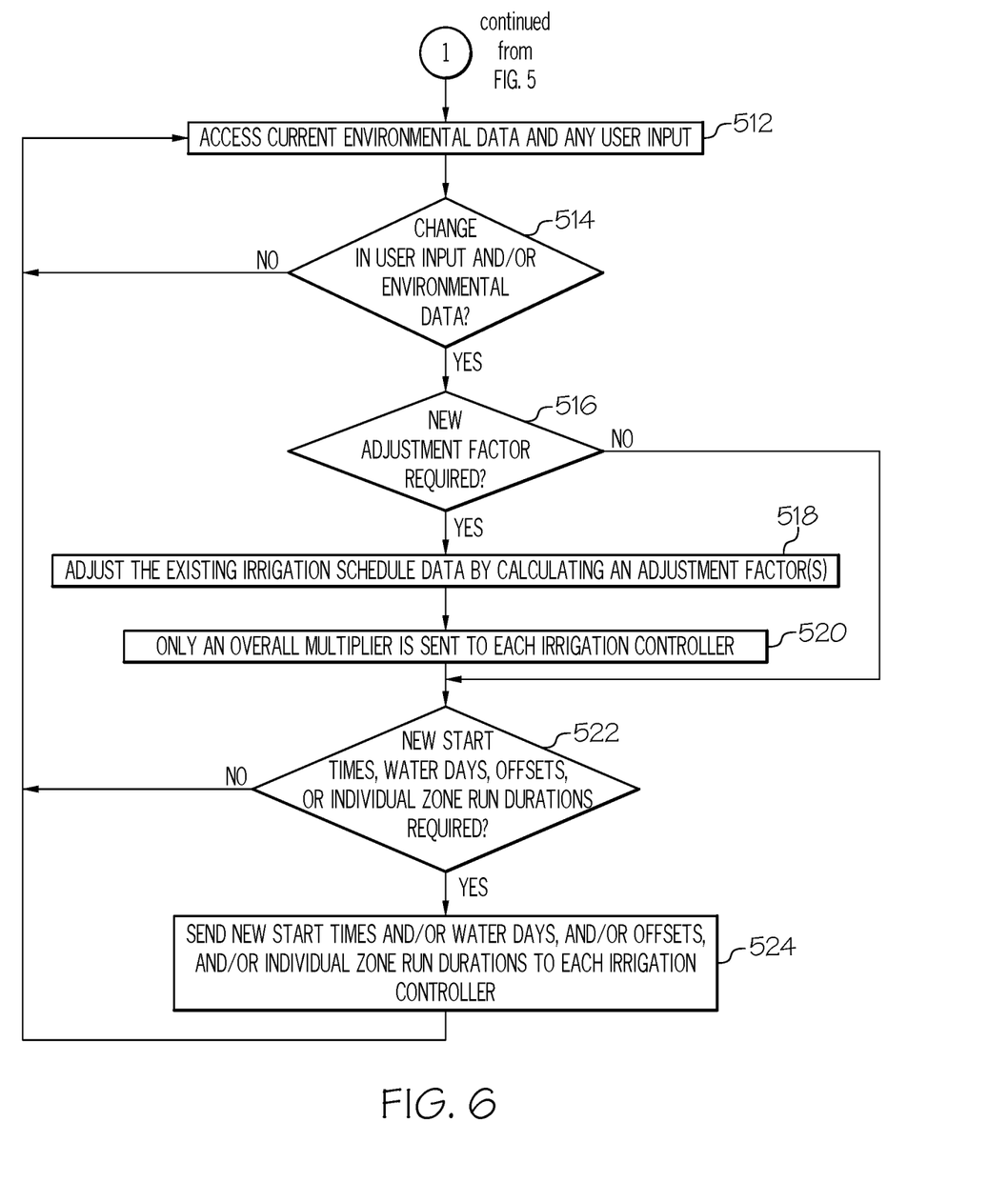

FIG. 5 and FIG. 6 is a flow diagram of the irrigation control software running on the server of FIG. 1. The process begins in step 502 and immediately proceeds to step 504. In step 504 the data is collected. The data can be collected from various databases 136, 138 including data such as national weather forecasts, regional weather forecasts, micro-weather forecasts i.e. forecast for areas smaller than a 1 square kilometer. Examples of this weather data are rainfall, weather, soil moisture, current and evapotranspiration rate, and government data such as times irrigation system operation is prohibited and other user data. Data may also include data read from sensor data 256, 266, 286, 296. The process continues to step 508.

Figure 7:
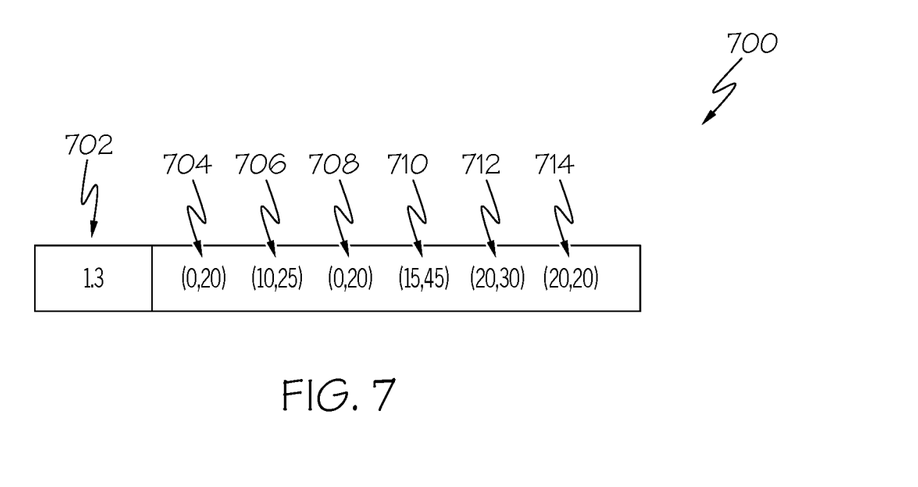
FIG. 7 is an ordered array with an overall multiplier created by the server of FIG. 1 and used with the software on the irrigation controller of FIG. 1 and FIG. 2.

In step 508, the data from step 504 including other data from other sources is accessed. The other sources include the system configuration data and the operating history of the irrigation system which may be stores in databases 136, 138. The central irrigation system calculates and enters, by site, the irrigation schedule data for each irrigation controller's programs and zones, such as the start times, water days, zone run durations, and zone start offsets. This data is presented in an ordered array with overall multiplier 700, shown in FIG. 7, for each zone for i) an offset from an irrigation cycle start time according to a master clock in the irrigation controller and ii) length of run time, with an overall multiplier for the ordered array. An example of this ordered array with overall multiplier 700 is shown in FIG. 7 and further described below. The process continues to step 510. In one example the set of the one or more irrigation zones are in numerical order. In another example the set of one more irrigation zones is out of numerical order.

In the irrigation plan in which there are a plurality of irrigation zones, it is important to note that more than one zone may be operated simultaneously in order to achieve at least one of hydraulic efficiency of a site and/or an electrical efficiency of the site and/or to maintain flow velocity within best operational range with regard to scouring pipes and limiting maximum flow velocities. Moreover, the irrigation zones may be operated by two or more pumps that operate simultaneously to achieve these efficiency and operational targets.

In step 510, the ordered array with an overall multiplier 700, water Days, number of zones, valve types, and more is sent to each irrigation controller 142, 144, 146 and 244, 274. The process continues on the next page to FIG. 6 at step 512.

In step 512, current environmental data from various databases 136, 138 from sensor data 256, 266, 286, 296 is accessed. The process continues to step 514 in which a test is made. Step 514 determines if there is a change to user input, environmental data, or both. In the case there is no change the process loops back to step 512. Otherwise the process continues to step 516.

Step 516 is another test. In this test the server 134 determines if an adjustment factor, i.e. the overall multiplier, to the ordered array with overall multiplier 702 is required. Factors that would require a change to the overall multiplier 702 are if the run time of each zone in an existing irrigation schedules needs to be increased or decreased to a change in environmental data, user input or both. If not change to the overall multiplier is required, the process continues to step 522 which is further described below. Otherwise, the process continues to step 518.

In step 518, in response to the test in step 516 requiring a change to the adjustment factor, a new adjustment factor is calculated by server 134. A simple example, but non-limiting example, is if the run time to the existing irrigation schedule needs to be increased by 30% due to a change in environmental data, user input or both than the overall multiplier 702 would be set to 1.3. The process proceeds to step 520 where only the overall multiplier is sent to each irrigation controller to adjust the irrigation schedule. Sending only the overall multiplier 702 greatly reduces the amount of data transmitted to each irrigation controller 142, 144, 146 and 244, 274. The process continues to step 522 for a third test.

Step 522 is a third test to determine if any of new start times, water days, start zone offsets, zone start offsets, individual zone run durations, or any combination of these is required to each irrigation controller 142, 144, 146 and 244, 274.

In the case that no new start times, water days, zone start offsets individual zone run durations, or any combination of these, the process loops back to step 512 as shown. Otherwise the process continues to step 524.

In step 524, the new start times, water days, offsets, zone start offsets, individual zone run durations or any combination of these to each irrigation controller 142, 144, 146 and 244, 274.

FIG. 7 is an ordered array with an overall multiplier 700 created by the server of FIG. 1 and used with running the software on the irrigation controller of FIG. 1 and FIG. 2. Shown is an overall multiplier 702 and six pairs of offsets and run durations 704, 706, 708, 710, 712, 714. These six pairs of offsets and run durations correspond to the pairs 310 shown in graphical user interface of FIG. 3.

It is important to note that there may one ordered array with an overall multiplier 702 for each irrigation controller. Or in another example, multiple irrigation controllers may use the identical overall multiplier 702.

Flow Diagram of Irrigation Controller Handling Updates

Figure 8:
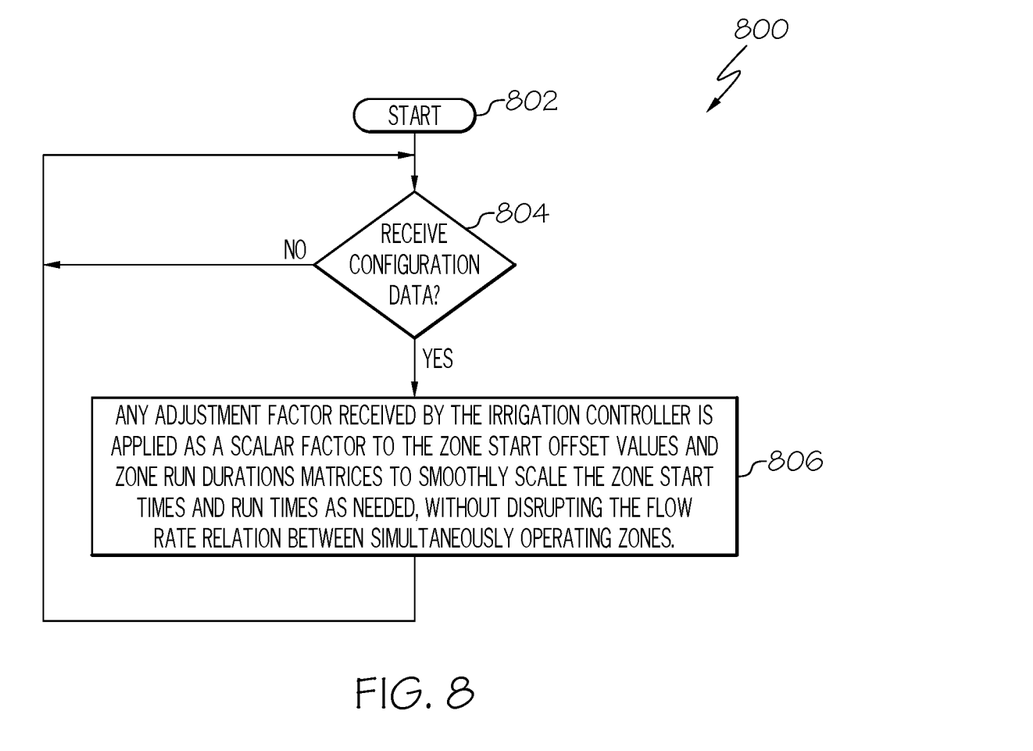
FIG. 8 is a flow diagram of the irrigation control software running on the irrigation controller of FIG. 1 and FIG. 2.

FIG. 8 is a flow diagram 800 of the irrigation control software running on the irrigation controller of FIG. 1 and FIG. 2. The process begins in step 802 and immediately proceeds to step 804 in which a test is made. The test in step 804 determines if any new configuration data is received from the application server 134. In the case new configuration data is not received, the process loops back to step 804 as shown. Otherwise in the case where new configuration data is received, the process continues to step 806.

In step 806 any adjustment factor received by the irrigation controller 142, 144, 146 and 244, 274 is applied as a scalar factor to the zone start offset values and zone run durations matrices to smoothly scale the zone start times and run times as needed, without disrupting the flow rate relation between simultaneously operating zones.

The process loops back to step 802.

Server/Irrigation Controller

Figure 9:
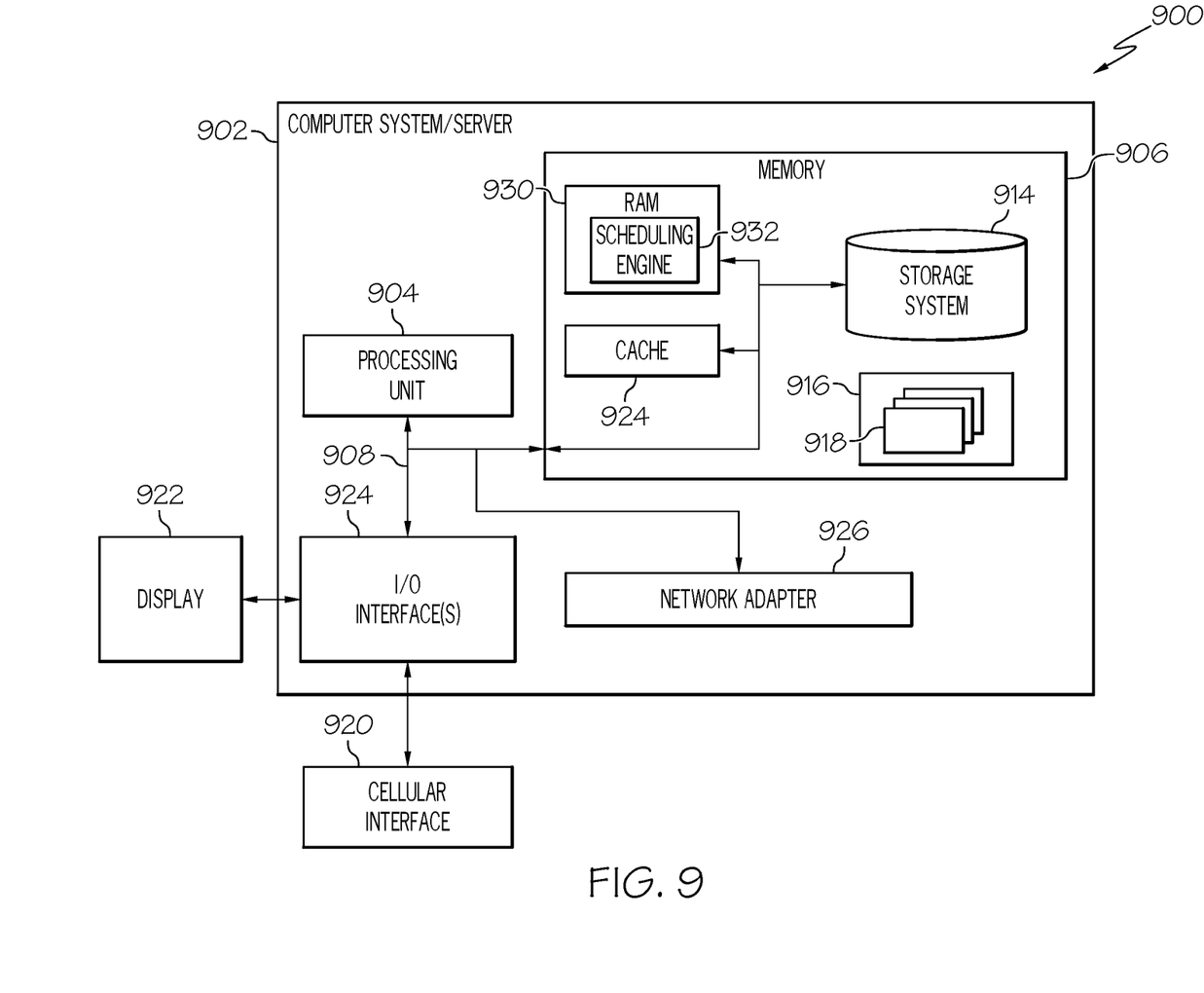
FIG. 9 is a block diagram of a computer system useful for implementing the software steps of the present invention.

FIG. 9 is a diagram of a computer system useful for implementing irrigation control software of the present invention upon which flow diagrams of FIG. 5, FIG. 6 and FIG. 8 can operate. FIG. 9 illustrates one example of a processing node and is not intended to suggest any limitation as to the scope of use or functionality of embodiments of the invention described herein. Regardless, the computing node 900 is capable of being implemented and/or performing any of the functionality set forth hereinabove.

Referring now to FIG. 9, this figure is a block diagram 900 illustrating an information processing system that can be utilized in embodiments of the present invention. The components of the information processing system 902 can include, but are not limited to, one or more processors or processing units 904, a system memory 906, and a bus 908 that couples various system components including the system memory 906 to the processor 904. The system memory 906 can include the flow chart of FIG. 5, FIG. 6 and FIG. 8. The system memory can also include data of various types including Initial system configuration data, current environmental data is collected, history of the irrigation system, irrigation schedule data and more.

The bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The information processing system 902 can further include other removable/non-removable, volatile/non-volatile computer system storage media. By way of example only, a storage system 914 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 908 by one or more data media interfaces. The memory 906 can include at least one program product having a set of program modules that are configured to carry out the functions of an embodiment of the present invention.

Program/utility 932, with a set of program modules, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. Program modules 988 generally carry out the functions and/or methodologies of embodiments of the present invention.

The information processing system 902 can also communicate with one or more external devices 920 such as a keyboard, a pointing device, a display 922, etc.; one or more devices that enable a user to interact with the information processing system 902; and/or any devices (e.g., network card, modem, etc.) that enable computer system/server 902 to communicate with one or more other computing devices. Such communication can occur via I/O interfaces 924. Still yet, the information processing system 902 can communicate with one or more networks such as a local area network (LAN), a general wide area network (WAN), and/or a public network (e.g., the Internet) via network adapter 926. As depicted, the network adapter 926 communicates with the other components of information processing system 902 via the bus 908. Other hardware and/or software components can also be used in conjunction with the information processing system 902. Examples include, but are not limited to: microcode, device drivers, redundant processing units, external disk drive arrays, RAID systems, tape drives, and data archival storage systems.

Non-Limiting Examples

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions The description of the present application has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for managing a schedule on an irrigation controller, the method comprising:
    for each irrigation zone out of a set of one or more irrigation zones, receiving input for an irrigation controller for i) an offset from an irrigation cycle start time according to a master clock in the irrigation controller and ii) a length of run time:
        a) storing in an ordered array the offset from the irrigation cycle start time and the length of run time;
        b) storing an overall multiplier for an array; and
        c) wirelessly transmitting the ordered array to the irrigation controller;
    receiving a change to an overall irrigation run cycle for the irrigation controller;
    updating the overall multiplier for the array based on the change in the overall irrigation run cycle; and
    wirelessly transmitting the overall multiplier for the array to the irrigation controller.

2. The method of claim 1, wherein the change to the overall irrigation run cycle for the irrigation controller is based on one or more of weather, evapotranspiration rate, soil moisture, rainfall, or a combination thereof.

3. The method of claim 1, further comprising:
    a pump station communicatively coupled to a set of irrigation controllers; and
    repeating steps a through c for each irrigation controller in the set of irrigation controllers.

4. The method of claim 1, wherein the set of the one or more irrigation zones are out of numerical order.

5. The method of claim 1, wherein at least two or more irrigation zones are operated simultaneously in order to achieve at least one of hydraulic efficiency of a site, an electrical efficiency of the site or a combination of both.

6. The method of claim 5, wherein the at least two or more irrigation zones are operated by two or more pumps that operate simultaneously.

7. The method of claim 5, wherein the at least two or more irrigation zones are operated simultaneously in order to achieve at least one of hydraulic efficiency between a minimum flow velocity to promote scouring of pipes and a maximum flow velocity to mitigate cavitation and water hammer.

8. A system for managing a schedule on an irrigation controller, the system comprising:
    a computer memory capable of storing machine instructions; and
    a hardware processor in communication with the computer memory, the hardware processor configured to access the computer memory, the hardware processor performing
    for each irrigation zone out of a set of one or more irrigation zones, receiving input for an irrigation controller for i) an offset from an irrigation cycle start time according to a master clock in the irrigation controller and ii) a length of run time:
  a) storing in an ordered array the offset from the irrigation cycle start time and the length of run time;
  b) storing an overall multiplier for an array; and
  c) wirelessly transmitting the ordered array to the irrigation controller;
receiving a change to an overall irrigation run cycle for the irrigation controller;
updating the overall multiplier for the array based on the change in the overall irrigation run cycle; and
wirelessly transmitting the overall multiplier for the array to the irrigation controller.

9. The system of claim 8, wherein the change to the overall irrigation run cycle for the irrigation controller is based on one or more of weather, evapotranspiration rate, soil moisture, rainfall, or a combination thereof.

10. The system of claim 8, further comprising:
  a pump station communicatively coupled to a set of irrigation controllers; and
  repeating steps a through c for each irrigation controller in the set of irrigation controllers.

11. The system of claim 8, wherein the set of the one or more irrigation zones are out of numerical order.

12. The system of claim 8, wherein at least two or more irrigation zones are operated simultaneously in order to achieve at least one of hydraulic efficiency of a site, an electrical efficiency of the site or a combination of both.

13. The system of claim 12, wherein the at least two or more irrigation zones are operated by two or more pumps that operate simultaneously.

14. The system of claim 12, wherein the at least two or more irrigation zones are operated simultaneously in order to achieve at least one of hydraulic efficiency between a minimum flow velocity to promote scouring of pipes and a maximum flow velocity to mitigate cavitation and water hammer.

15. A non-transitory computer program product tangibly embodying computer readable instructions which, when implemented, cause a computer to carry out the steps of a method for managing a schedule on an irrigation controller on a storage media, comprising:
  for each irrigation zone out of a set of one or more irrigation zones, receiving input for an irrigation controller for i) an offset from an irrigation cycle start time according to a master clock in the irrigation controller and ii) a length of run time:
    a) storing in an ordered array the offset from the irrigation cycle start time and the length of run time;
    b) storing an overall multiplier for an array; and
    c) wirelessly transmitting the ordered array to the irrigation controller;
  receiving a change to an overall irrigation run cycle for the irrigation controller;
  updating the overall multiplier for the array based on the change in the overall irrigation run cycle; and
  wirelessly transmitting the overall multiplier for the array to the irrigation controller.

16. The non-transitory computer program product of claim 15, wherein the change to the overall irrigation run cycle for the irrigation controller is based on one or more of weather, evapotranspiration rate, soil moisture, rainfall, or a combination thereof.

17. The non-transitory computer program product of claim 15, wherein the change to the overall irrigation run cycle for the irrigation controller is based on one or more of weather, evapotranspiration rate, soil moisture, rainfall, or a combination thereof.

\* \* \* \* \*